Patented Jan. 6, 1953

2,624,686

UNITED STATES PATENT OFFICE 2,624,686

HIGH WET-STRENGTH PAPER AND PROCESS OF MAKING

Jonas Kamlet, Easton, Conn., assignor to Mathieson Chemical Corporation, Baltimore, Md., a corporation of Virginia No Drawing. Application November 4, 1948, Serial No. 58,371

7 Claims. (Cl. 117—155)

This invention relates to a process and a series of products for imparting high wet-strength to paper. More particularly, it relates to a group of monomeric compounds and the process whereby these compounds are incorporated within the paper sheeting during the course of its manufacture, and caused to polymerize to a resin (or "cure") within the paper and thus impart high tensile strength to the paper when wet with water, as well as improved resistance to soap, oil, grease, et cetera.

The purpose of the present invention is to provide paper having a high tensile strength while wet with water, high water absorptivity, and good resistance to oil, grease, soap and other liquids. Another purpose of the present invention is to provide paper suitable for the manufacture of towelling, facial tissues, toilet paper, handkerchiefs, napkins, bags, containers, sanitary objects, diapers, dress shields, maps and other documents subject to rough usage, et cetera, where such high wet-strength and chemical resistance is highly desirable.

The Dictionary of Paper (American Pulp and Paper Institute, New York, 1940) defines wet-strength in paper as "the tensile strength of a specimen of paper after it has been wetted with water under specified conditions." The wet strength may be of a more or less temporary nature, as in paper towels and tissues, or of a more permanent nature, as in bag papers, cookery parchment, etc., where the paper is in contact with water for longer periods of time.

High wet-strength is now imparted to paper almost universally by incorporating a monomer of a resin during the manufacture of the paper, and polymerizing the monomer to a polymer (i. e. "curing") within the paper. The paper does not thus become waterproof. Its water absorption is often increased. The effect obtained is to hold the fibers of the paper together with a bond which is not disintegrated when the paper is moistened with water and other liquids. This treatment also improves the dry (or normal) strength of the paper, as might be expected. As explained by Weber (Printing Equipment Engineer, 70, #5, August 1945): "Paper is a matted or felted sheeting of vegetable fibers formed on a screen from a water suspension of the fibers. In their preparation for fabrication into the sheeting, the fibers are treated in water by a mechanical process known as beating. This beating, in addition to otherwise fitting the fibers for uniform felting, causes them to absorb water and from a gelatinous film on the surfaces by a structural change called 'hydration.' When the paper is dried, the gelatinous layer acts as a cement, bonding the fibers together at all points of contact to give the sheeting strength. This cement remains water-sensitive, consequently when a sheet of ordinary paper is wetted, the cement absorbs water and reverts to the gelatinous condition, allowing the fibers to fall apart. In resin bonding, one of the synthetic resins is added to the fiber suspension in a form that attaches itself to the fibers and cements them together as the paper is formed. Subsequent curing of the resin renders it insoluble in water and most other liquids. Apparently the resin supplements or replaces the normal water-sensitive bonds of fiber gel with insoluble and more durable ties."

A very considerable variety of monomeric resin-forming agents have been employed to impart high wet-strength to paper. These include: (a) phenol - formaldehyde condensates: Ruff, Germany Patent #327,399; Foulds, Marsh and Wood, U. S. Patent #1,734,516, et cetera; (b) urea- and thiourea-formaldehyde condensates: Heuck and Esselman, U. S. Patent #1,734,760; Clayton, Journ. Soc. Dyers and Colourists, 48, 295–298 (1932); Rossiter and Davis, U. S. Patent #1,926,063; Society of Chemical Industry, British Patent #431,956; American Reinforced Paper Co., French Patent #821,840; Bowen and Dyke, U. S. Patents #2,098,082–3; Lane and Peters, U. S. Patent #2,136,110; Scott Paper Company, British Patents #502,724, 502,855–6; Britt, Canadian Patent #385,773; U. S. Patents #2,325,302, 2,399,981; Schur, U. S. Patent #2,338,602; Brown Company, British Patent #523,185, Canadian Patent #395,453; Belgian Patents #436,052–3; Taft, Paper Trade Journal, 112TS, 122–6 (1941), ibid., 115, #16, 30–32 (1942); Menger, U. S. Patent #2,236,184, et cetera; (c) melamine-formaldehyde condensates: Hofferbert, U. S. Patents #2,291,079–80; Liander, Svensk Pappers-Tidning, 44, 481–485 (1941); Lindberger, Svensk Pappers-Tidning, 45, 397–400 (1942); American Cyanamid Co. Bulletin on Paper Resin 605 for Wet Strength; Auten, Resinous Reporter, 8, #3, 2–6 (May, 1947); Landes and Maxwell, Paper Trade Journal, August 9, 1945; American Cyanamid Co. Reprint #16—Parez Resin 607; National Bureau of Standards, Research Paper RP 1887, June, 1948, et cetera, and a very considerable number of other monomeric resin-forming agents.

I have found that the objects of the present invention can be accomplished by incorporating within the paper from 0.5% to 10.0% (based on the bone-dry weight of the paper) of a member of the group of monomers of the general formula:

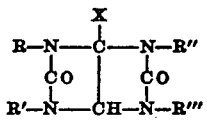

where X is a member of the group consisting of hydrogen and methyl, R, R', R'' and R''' are members of the group consisting of hydrogen, hydroxymethyl, formylhydroxymethyl, acetylhydroxymethyl, hydroxypropyl, hydroxyethyl, hydroxybutyl and hydroxybutenyl (hydroxycrotyl), and no more than two members of said group are hydrogens.

When two moles of urea are heated with one mole of glyoxal in aqueous solution, there is obtained in near-quantitative yield, the compound tetrahydroimidaz(d)imidazole-2,5(1,3)-dione (see Chemical Abstracts, Third Decennial Index, page 5200 for structural identification), also referred to as glycoluril and acetylenediureine:

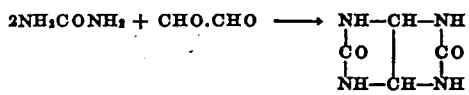

Under the same conditions, two moles of urea and one mole of pyruvic aldehyde (methylglyoxal)(CH₃COCHO) yields tetrahydromethylimidaz(d)imidazole-2,5(1,3)-dione:

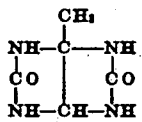

These bicyclic compounds condense in alkaline solution with one, two, three or four moles of various aldehydes, to yield a series of monomeric compounds substituted on one, two, three or all four of the imino nitrogens by a —CHOH.A— group (where A.CHO represents the aldehyde used).

I have found that compounds prepared by condensing in alkaline solution: (a) one mole of a member of the group consisting of tetrahydroimidaz(d)-imidazole-2,5(1,3)-dione and tetrahydromethylimidaz(d)imidazole - 2,5(1,3)-dione, with (b) two, three or four moles of a member of the group of aldehydes consisting of formaldehyde, glyoxal, pyruvic aldehyde, acetaldehyde, propionaldehyde, butyraldehyde and crotonaldehyde, yield monomers of the general formula:

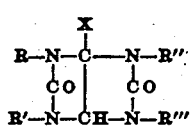

where X is a member of the group consisting of hydrogen and methyl, R, R', R'' and R''' are members of the group consisting of hydrogen, hydroxymethyl, formalhydroxymethyl, acetylhydroxymethyl, hydroxyethyl, hydroxypropyl, hydroxybutyl and hydroxybutenyl (hydroxycrotyl), and no more than two members of said group are hydrogens. When four moles of aldehyde are employed per mole of the bicyclic compound, imparting high wet-strength to paper are obtained. Typical examples of such monomers are monomers of the greatest suitability for use in given herewith:

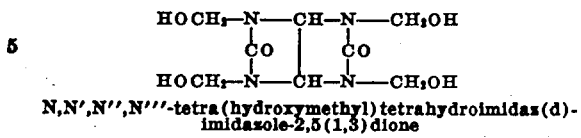

N,N',N'',N'''-tetra(hydroxymethyl)tetrahydroimidaz(d)-imidazole-2,5(1,3)dione

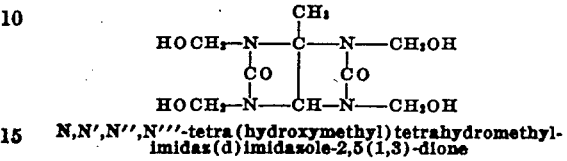

N,N',N'',N'''-tetra(hydroxymethyl)tetrahydromethylimidaz(d)imidazole-2,5(1,3)-dione

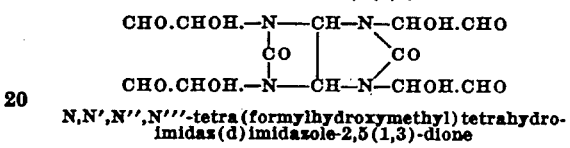

N,N',N'',N'''-tetra(formylhydroxymethyl)tetrahydroimidaz(d)imidazole-2,5(1,3)-dione

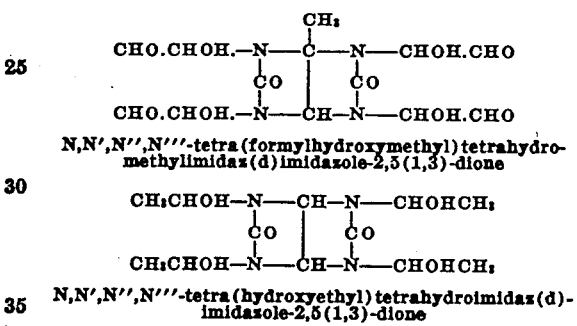

N,N',N'',N'''-tetra(formylhydroxymethyl)tetrahydromethylimidaz(d)imidazole-2,5(1,3)-dione

CH₃CHOH—N——CH—N——CHOHCH₃
　　　　　CO　　　　CO
CH₃CHOH—N——CH—N——CHOHCH₃

N,N',N'',N'''-tetra(hydroxyethyl)tetrahydroimidaz(d)-imidazole-2,5(1,3)-dione et cetera, et cetera. It is not excluded that, when bifunctional aldehydes (such as glyoxal and pyruvic aldehyde) are used for condensation with the bicyclic compounds, a certain amount of cross-linking occurs, as for instance, between two molecules of tetrahydroimidaz(d)imidazole-2,5(1,3)-dione and one molecule of glyoxal, to yield a compound such as:

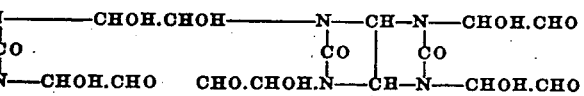

Condensates of tetrahydroimidaz(d)imidazole-2,5(1,3)-dione and formaldehyde are described in the I. G. Farbenindustrie German Patents #702,146 (January 2, 1941) and #719,394 (March 12, 1942).

The monomers of the present invention are mixed, in aqueous solution, with an acidic catalyst immediately prior to application to the paper sheet in any convenient manner as, for instance, by dipping, spraying or padding. The paper so treated is then passed through a series of squeeze rolls to remove the excess solution and to obtain a uniform impregnation of the paper. The monomer content of the paper is thus adjusted to between 0.5% and 10.0% on the bone-dry weight of the paper. The paper may then be dried in any convenient manner as, for instance, in an oven or any other suitable drying device at about 100° C. for five to fifteen minutes. The dried paper, impregnated with the monomer, is then "cured" (i. e. the monomer is polymerized within the paper) by heating at about 150° C. for three to five minutes. The resultant paper has an excellent wet-strength and high resistance to grease, oil, soap and other liquids.

Other means of curing are entirely feasible. Thus, the drying and the curing may be effected simultaneously.

It is also feasible, and indeed often preferable, to incorporate the monomeric compound and the acidic catalyst within the paper pulp slurry at some point prior to the sheet formation on the paper machine. Addition at the beater is a recommended procedure, since it is the most convenient method and results in a more rapid rate of wet-strength development when the resin monomer is added early in the beating cycle.

The curing, or polymerizing operation, may also be effected by aging the paper at lower temperatures, rather than by drying and heating at advanced temperatures. Thus, by aging at room temperature (60°–80° F.) for one to two weeks, full development of wet-strength results, comparable to that obtained by drying at 100° C. and curing at 150° C., as previously indicated.

A most important method for effecting the curing operation of the paper treated with the monomers of the present invention is to use a mixture of the monomer and a "latent" acidic catalyst for impregnating the paper. Such "latent" catalysts are secondary ammonium phosphate $(NH_4)_2HPO_4$, tertiary ammonuim phosphate $(NH_4)_3PO_4$, tertiary morpholine phosphate $$(C_4H_9ON)_3 \cdot H_3PO_4$$

tertiary methylamine phosphate $$(CH_3NH_2)_3 \cdot H_3PO_4$$

et cetera. Mixtures of these neutral or alkaline salts with the resin monomer are compatible and may be stored for indefinite periods without deterioration or resinofication, in closed or stoppered containers. However, on heating during the curing operation, or on passing the paper sheet over heated rollers in the paper machine, or on standing at room temperature or above for a number of days exposed to the atmosphere (i. e. on aging), these neutral or alkaline salts are converted to acidic salts (by loss of the base, i. e. ammonia, morpholine, methylamine, etc.) whereupon these acidic salts so formed are capable of effecting the desired polymerization or curing within the paper. The "latent" acidic catalyst most often used in practice is secondary ammonium phosphate (which has a pH of 8.0), but gradually loses ammonia on exposure to the atmosphere, and more rapidly on heating, to form primary ammonium phosphate (which has a pH of 4.0) ideally suited as an acidic catalyst for curing the monomer within the paper.

The use of such "latent" acidic catalysts is very convenient in commercial practice. The claims referring to the presence in the paper of an "acid-polymerized resin" include resins polymerized by the addition of preformed acidic catalysts or by the use of such "latent" acidic catalysts which may be neutral or alkaline when prepared and mixed with the resin monomer, but which develop an acidic reaction upon exposure to heat, upon drying, or upon storage or aging at lower temperatures.

The following examples are given to define and illustrate the present invention, but in no way to limit it to reagents, proportions or conditions described therein. Obvious modifications and improvements will occur to any person skilled in the art.

*Example I*

To 195.0 kgs. of technical 30% glyoxal solution (1.0 mole) add 120.0 kgs. of urea (2.0 moles) and heat the mixture with gentle stirring, at 95°–100° C. for twenty minutes. Add now 343.0 kgs. of technical 35% formaldehyde solution and 14.0 kgs. of calcium hydroxide slurried in 50.0 liters of water, and heat the stirred mixture at 35°–45° C. until the odor of formaldehyde has largely disappeared and the formation of the N,N',N'',N'''-tetra(hydroxymethyl)tetrahydroimidaz(d)-imidazole-2,5(1,3)-dione is complete. Now adjust the solution to pH 7.0 with 25% sulfuric acid, filter off the insoluble calcium sulfate and concentrate the filtrate under reduced pressure, at a temperature under 60° C., to a syrup comprising 520.0 kgs. of a 50% solution of N,N',N'',N'''-tetra(hydroxymethyl)tetrahydroimidaz(d)imidazole - 2,5(1,3)-dione.

If, in the above procedure, there is used 240.0 kgs. of technical 30% pyruvic aldehyde solution (in place of the glyoxal), there is obtained 550.0 kgs. of a 50% solution of N,N',N'',N'''-tetra(hydroxymethyl)tetrahydromethylimidaz(d)imidazole-2,5(1,3)-dione.

A sheet of dry paper, intended for paper towelling, is sprayed with a freshly prepared solution of the resin monomer and sulfuric acid, so as to contain, on the dry weight of the paper:

N,N',N'',N''' - tetra(hydroxymethyl)tetrahydroimidaz(d)-imidazole-2,5(1,3)-dione. — 6.0% of the 50% solution.
Sulfuric acid _____ 0.10%.

The paper is then dried, preferably at a relatively low temperature, say below 150° F., in order to guard against polymerization while the paper is in a wet or moist state. Subsequent to drying, the paper web is heated to a temperature sufficient to convert the monomer to an insoluble polymer, as, for instance, at 275°–300° F. for a total heating period of about thirty seconds. The amount of heating received by a sheet of paper in passing through the drying rollers of the paper machine in the normal papermaking process is sufficient to effect such polymerization. The resultant paper has good high wet-strength and excellent chemical resistance.

*Example II*

To 195.0 kgs. of technical 30% glyoxal solution (1.0 mole) add 120.0 kgs. of urea (2.0 moles) and heat the mixture, with gentle stirring, at 95°–100° C. for twenty minutes. Now cool to room temperature and add 14.0 kgs. of calcium hydroxide slurried with 50.0 liters of water and 780.0 kgs. of technical 30% glyoxal solution (4.0 moles). Let stand for 36 hours at room temperature, then adjust the solution to pH 7.0 with 25% sulfuric acid, filter off the insoluble calcium sulfate, and concentrate the filtrate under reduced pressure, at a temperature under 60° C., to a thick syrup comprising 740.0 kgs. of a 50% solution of N,N',N'',N'''-tetra(formylhydroxymethyl)tetrahydroimidaz(d)imidazole - 2,5(1,3)-dione.

If, in the above procedure, there is used 240.0 kgs. of 30% pyruvic aldehyde (in place of the glyoxal first condensed with the urea), there is thus obtained 770.0 kgs. of a 50% solution of N,N',N'',N'''- tetra(formylhydroxymethyl)tetrahydromethylimidaz(d)imidazole-2,5(1,3)-dione.

There is added to a kraft paper pulp slurry, at the beater, a sufficient amount of a unitary solution of the resin monomer and secondary ammonium phosphate, so as to give, on the dry weight of the pulp, a concentration of:

N,N',N'',N''' - tetra(formylhydroxymethyl)tetrahydroimidaz(d)imidazole - 2,5(1,3) - dione.  4.0% of the 50% solution.
Secondary ammonium phosphate.  0.25% in the pulp. The pulp is then converted to kraft paper by the usual procedure, on the paper machine, and is then aged for 14 days at 75° F. for full development of wet-strength and chemical resistance characteristics.

Other agents, adjuvants, modifiers and ancillary materials may be mixed with the monomers of the present invention, or otherwise incorporated into the paper to improve or modify its characteristics. These include casein, alum, rosin, starch, albumin, alkyd resins and the numerous other agents often used in the manufacture of paper.

The following table indicates the improvement in tensile strength obtained in using the resin monomers of the present invention, with 100% unbleached kraft pulp:

| Resin | Direction | Tensile strength (lbs. per sq. inch width) | | |
|---|---|---|---|---|
| | | Dry | Wet | Percent |
| None | Machine | 19.0 | 2.1 | 11.0 |
| 3% N, N', N'', N'''-tetra(hydroxymethyl)-tetrahydroimidaz(d)imidazole-2,5(1,3)-dione. | Machine | 22.4 | 5.2 | 23.0 |
| | | 22.5 | 6.2 | 27.5 |
| | | 22.4 | 7.2 | 32.3 |
| | Cross machine | 11.2 | 3.2 | 28.1 |
| | | 13.5 | 4.1 | 30.4 |
| | | 13.3 | 4.7 | 35.6 |
| 2% N,N',N'',N'''-tetra(formylhydroxymethyl)-tetrahydroimidaz(d)imidazole-2,5(1,3)-dione. | Machine | 25.1 | 6.5 | 25.9 |
| | | 27.0 | 7.5 | 27.8 |
| | | 26.5 | 7.8 | 29.4 |
| | Cross machine | 14.7 | 4.1 | 27.9 |
| | | 16.4 | 4.9 | 29.8 |
| | | 14.2 | 4.1 | 28.9 |

Having described my invention, what I claim and desire to protect by Letters Patent is:

1. A process of increasing the wet-strength of paper which comprises treating the paper with an aqueous solution consisting essentially of water and N,N',N'',N''' - tetra(formylhydroxymethyl)tetrahydroimidaz(d)imidazole - 2,5(1,3) - dione, so that the proportion thereof is from 0.5% to 10.0% of the weight of the paper (on a bone-dry basis) and polymerizing said monomer in the paper.

2. A high wet-strength paper containing from 0.5% to 10.0% (on the basis of the dry weight of the paper) of an acid-polymerized resin consisting essentially of the polymer formed by polymerizing N,N',N'',N'''-tetra(formylhydroxymethyl)tetrahydroimidaz(d)imidazole - 2,5(1,3) - dione within the paper under acidic conditions.

3. A process of increasing the wet-strength of paper which comprises treating the paper with an aqueous solution consisting essentially of water and N,N',N'',N''' - tetra(formylhydroxymethyl)tetrahydromethylimidaz(d)imidazole-2,5(1,3)-dione, so that the proportion thereof is from 0.5% to 10.0% of the weight of the paper (on a bone-dry basis) and polymerizing said monomer in the paper.

4. A high wet-strength paper containing from 0.5% to 10.0% (on the basis of the dry weight of the paper) of an acid-polymerized resin consisting essentially of the polymer formed by polymerizing N,N',N'',N'''-tetra(formylhydroxymethyl)tetrahydromethylimidaz(d)imidazole-2,5(1,3)-dione within the paper under acidic conditions.

5. A process of increasing the wet-strength of paper which comprises treating the paper with an aqueous solution consisting essentially of water and a member of the group of monomers of the general formula:

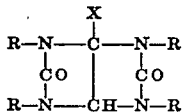

wherein X is a member of the group consisting of hydrogen and methyl and R is a formylhydroxymethyl radical, so that the proportion thereof is from 0.5% to 10.0% of the weight of the paper (on a bone-dry basis), and polymerizing said monomer in the paper.

6. A high wet-strength paper containing from 0.5% to 10.0% (on the basis of the dry weight of the paper) of an acid-polymerized resin consisting essentially of the polymer formed by reacting in an alkaline aqueous medium four moles of glyoxal with one mole of a member of the group consisting of tetrahydroimidaz(d)-imidazole-2,5(1,3)-dione and tetrahydromethylimidaz(d)imidazole-2,5(1,3)-dione, and polymerizing the resultant monomer within the paper under acidic conditions.

7. A high wet-strength paper containing from 0.5% to 10.0% (on the basis of the dry weight of the paper) of an acid-polymerized resin consisting essentially of the polymer formed by polymerizing within the paper, under acidic conditions, a member of the group of monomers of the general formula:

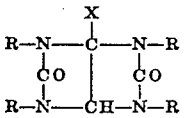

wherein X is a member of the group consisting of hydrogen and methyl and R is a formylhydroxymethyl radical.

JONAS KAMLET.

REFERENCES CITED

The following references are of record in the file of this patent:

UNITED STATES PATENTS

| Number | Name | Date |
|---|---|---|
| 2,291,079 | Hofferbert | July 28, 1942 |
| 2,325,302 | Britt | July 27, 1943 |

FOREIGN PATENTS

| Number | Country | Date |
|---|---|---|
| 858,223 | France | Nov. 20, 1940 |
| 902,620 | France | Sept. 5, 1945 |